(12) United States Patent
Takahashi

(10) Patent No.: US 12,538,067 B2
(45) Date of Patent: Jan. 27, 2026

(54) MEASUREMENT SYSTEM AND MEASUREMENT METHOD

(71) Applicant: PANASONIC INTELLECTUAL PROPERTY MANAGEMENT CO., LTD., Osaka (JP)

(72) Inventor: Takeshi Takahashi, Fukuoka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 288 days.

(21) Appl. No.: 18/153,229

(22) Filed: Jan. 11, 2023

(65) Prior Publication Data

US 2023/0224628 A1 Jul. 13, 2023

(30) Foreign Application Priority Data

Jan. 12, 2022 (JP) ................. 2022-003370

(51) Int. Cl.
 *H04R 25/00* (2006.01)
 *H04R 1/10* (2006.01)
(52) U.S. Cl.
 CPC ......... *H04R 1/1058* (2013.01); *H04R 1/1016* (2013.01); *H04R 1/1041* (2013.01)
(58) Field of Classification Search
 CPC .. H04R 1/1016; H04R 1/1041; H04R 1/1058; H04R 1/1083; H04R 2460/15
 USPC ....................................................... 381/380
 See application file for complete search history.

(56) References Cited

U.S. PATENT DOCUMENTS

| | | | |
|---|---|---|---|
| 2021/0014597 A1 | 1/2021 | Andersen et al. | |
| 2021/0014613 A1 | 1/2021 | Carrigan et al. | |
| 2021/0084402 A1 | 3/2021 | Terlizzi et al. | |
| 2023/0254629 A1* | 8/2023 | Ishibashi | G10K 15/00 381/71.6 |

FOREIGN PATENT DOCUMENTS

EP 4485969 A1 * 1/2025 ........... H04R 1/1016

OTHER PUBLICATIONS

Content Kanaal, "Sony WF-1000MX4 How to wear," YouTube Video, Jun. 10, 2021, uploaded by Kanaal, [Online] URL=https://www.youtube.com/watch?v=9JTlCj0NFhc, [retrieved from Internet Jan. 10, 2023]. (1 page) (Screenshot of earphones).

(Continued)

*Primary Examiner* — Phylesha Dabney
(74) *Attorney, Agent, or Firm* — Seed Intellectual Property Law Group LLP

(57) ABSTRACT

A measurement system includes earphones configured to be worn on a left ear and a right ear of a user and be interchangeably attached with earpieces having different sizes on one end portion of each, and a wireless terminal. Each of the earphones collects a sound signal by a microphone of the earphone in a case that the earphone outputs a sound signal from its speaker, the measurement system performs measurement processing to determine whether an ear of the user is sealed by the worn earpiece, and the wireless terminal includes a display unit, and displays, on the display unit, a notification indicating that a size of the worn earpiece is a most suitable size among sizes of the plurality of earpieces, or a notification urging replacement with another earpiece having a size larger than or smaller than the size of the worn earpiece.

11 Claims, 10 Drawing Sheets

(56) References Cited

OTHER PUBLICATIONS

Sony Corporation, "How to wear the earbud headphones and select the right size earbud tips," Jun. 24, 2022, [Online] URL=https://www.sony.com/electronics/support/wireless-headphones-bluetooth-headphones/wf-1000xm4/articles/00262839, [retrieved from Internet Jan. 10, 2023]. (7 pages).
Sony Corporation, "I hear noise (WF-1000XM4)," Jan. 19, 2022, [Online] URL=https://knowledge.support.sony.jp/electronics/support/articles/00265211, [retrieved from Internet date Jan. 10, 2023]. (14 pages).
Sony Corporation, "WF-1000XM4—Compact design and improved comfort," [Online] URL=https://www.sony.jp/headphone/products/WF-1000XM4/feature_3.html, [retrieved from Internet date Jan. 10, 2023]. (5 pages).
Sony Corporation, "WF-1000XM4—Design to fit," [Online] URL=https://www.sony.com/lr/headphones/products/wf-1000xm4/features5, [retrieved from Internet date Jan. 10, 2023]. (3 pages).
Extended European Search Report, dated Jun. 5, 2023, for European Patent Application No. 23151061.1. (9 pages).

\* cited by examiner

MEASUREMENT SYSTEM AND MEASUREMENT METHOD

CROSS-REFERENCE TO RELATED APPLICATIONS

This application is based on and claims priority under 35 USC 119 from Japanese Patent Application No. 2022-003370 filed on Jan. 12, 2022, the contents of which are incorporated herein by reference.

TECHNICAL FIELD

The present disclosure relates to a measurement system and a measurement method.

BACKGROUND ART

Non-Patent Literature 1 discloses a measurement system that can measure earpieces suitable for sizes of ears of a user wearing the earpieces during the earphones are communicably connects to a terminal device. During the user wears the earphones, the measurement system measures whether the ears of the user are sealed by the earpieces. When measuring a plurality of earpieces, the measurement system causes the terminal device to display a result indicating that an earpiece, having a minimum size among earpieces that obtain measurement results that the ear of the user is sealed, is an earpiece having an optimal size for the ear of the user.

Non-Patent Literature 1: Sony Corporation, "WF-1000XM4 Wireless Noise Cancelling Headphones", [on-line], Jun. 25, 2021, [Search in Nov. 2, 2021], Internet <URL:https://www.sony.com/en-sa/electronics/truly-wireless/wf-1000xm4#made-to-fit-you>

In recent years, a style has appeared in which a user inserts completely wireless earphones, also called True Wireless Stereo (TWS), into both left and right ears. Such a TWS are provided with microphones for collecting an external sound respectively in addition to speakers. The TWS cancel noise by analyzing the sound collected by the microphones, and output a high-quality sound from the speakers. In order to emit the sound output from the speakers to ears of the user without deteriorating the quality of the sound, it is necessary to seal the ears of the user with earpieces attached to the TWS. Noise canceling is an example of a method for outputting a high-quality sound from a TWS, and the method is not limited thereto.

In Non-Patent Literature 1, when an earpiece having an optimal size for an ear of the user is measured, since it is necessary to measure earpieces having all sizes for right and left TWS, there is a problem that the larger the number of types of the sizes of the earpieces, the more complicated the work of the user replacing the earpieces, and there is room for improvement from a viewpoint of improving convenience for the user.

SUMMARY OF INVENTION

The present disclosure has been devised in view of the above circumstances in the related art. An object of the present disclosure is to provide a measurement system and a measurement method that efficiently specify earpieces having sizes estimated to be optimal for ears of a user and improve convenience when the user selects earpieces.

The present disclosure provides an measurement system including: earphones configured to be respectively worn on a left ear and a right ear of a user and configured to be interchangeably attached with a plurality of earpieces having different sizes on one end portion of each of the earphones, and a wireless terminal configured to communicate with the earphones, in which each of the earphones includes a speaker and a microphone, and in a case that a sound signal transmitted from the wireless terminal or a sound signal output from the earphone is emitted from the speaker in a state that a worn earpiece, which is one of the plurality of earpieces, is worn on the left ear or the right ear of the user, the sound signal emitted from the speaker is collected by the microphone, the measurement system performs measurement processing at least once to determine whether the left ear or the right ear of the user is sealed by the worn earpiece based on the collected sound signal, and the wireless terminal includes a display unit, and displays, on the display unit, a notification indicating that a size of the worn earpiece worn by the user is a most suitable size among sizes of the plurality of earpieces, or a notification urging replacement with another earpiece having a size larger than or smaller than the size of the worn earpiece, based on a result of the measurement processing.

The present disclosure provides a measurement method for controlling earphones configured to be respectively worn on a left ear and a right ear of a user and configured to be interchangeably attached with a plurality of earpieces having different sizes on one end portion of each of the earphones, and a wireless terminal configured to communicate with the earphones, the method including: in each of the earphones, collecting a sound signal by a microphone of the earphone in a case that the sound signal transmitted from the wireless terminal or a sound signal output from the earphone is emitted from a speaker of the earphone in a state that a worn earpiece, which is one of the plurality of earpieces, is worn on the left ear or the right ear of the user, performing measurement processing at least once to determine whether the left ear or the right ear of the user is sealed by the worn earpiece based on the collected sound signal, and displaying, on a display unit of the wireless terminal, a notification indicating that a size of the worn earpiece worn by the user is a most suitable size among sizes of the plurality of earpieces, or a notification urging replacement with another earpiece having a size larger than or smaller than the size of the worn earpiece, based on a result of the measurement processing.

These comprehensive or specific aspects may be implemented by a system, a device, a method, an integrated circuit, a computer program, or a recording medium, or may be implemented by any combination of the system, the device, the method, the integrated circuit, the computer program, and the recording medium.

According to the present disclosure, it is possible to efficiently specify earpieces having sizes estimated to be optimal for ears of a user and improve convenience when the user selects earpieces.

BRIEF DESCRIPTION OF DRAWINGS

Exemplary embodiment(s) of the present invention will be described in detailed based on the following figures, wherein.

DESCRIPTION OF EMBODIMENTS

Hereinafter, embodiments in which a measurement system and a measurement method are specifically disclosed in the present disclosure will be described in detail with reference to the drawings as appropriate. However, unnecessarily detailed description may be omitted. For example, detailed description of well-known matters and redundant description of substantially the same configuration may be omitted. This is to avoid unnecessary redundancy of the following description and to facilitate understanding of those skilled in the art. The accompanying drawings and the following description are provided for those skilled in the art to fully understand the present disclosure, and are not intended to limit the subject matter described in the claims.

Figure 1:
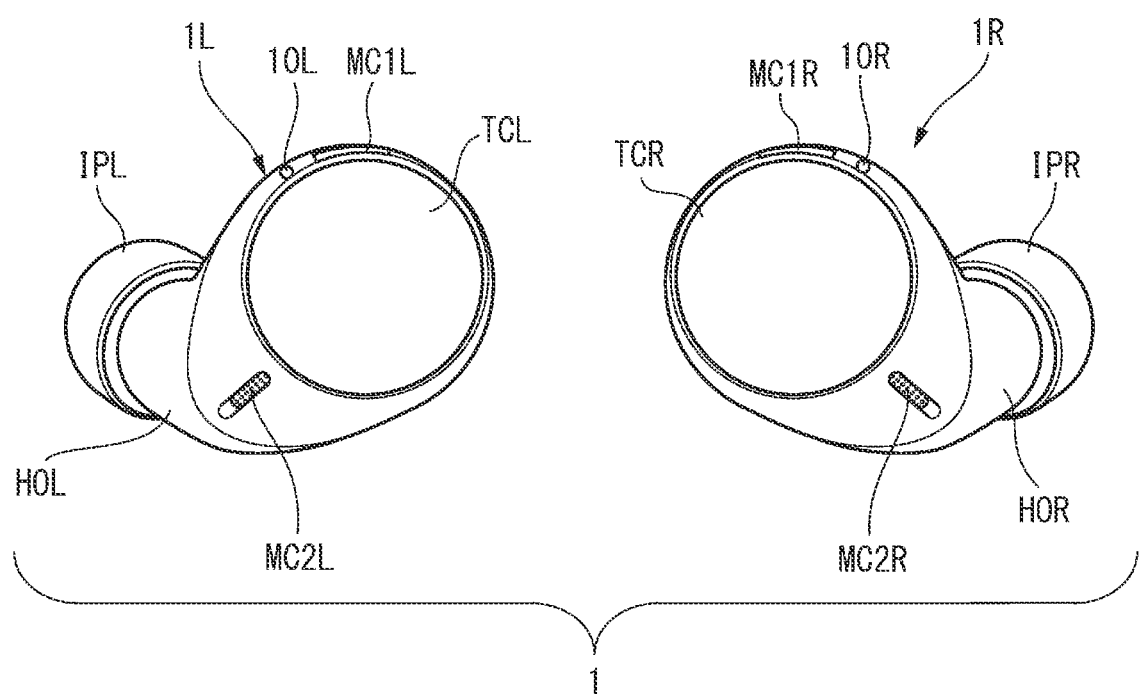
FIG. 1 is a front view of earphones according to the present embodiment.
Figure 2:
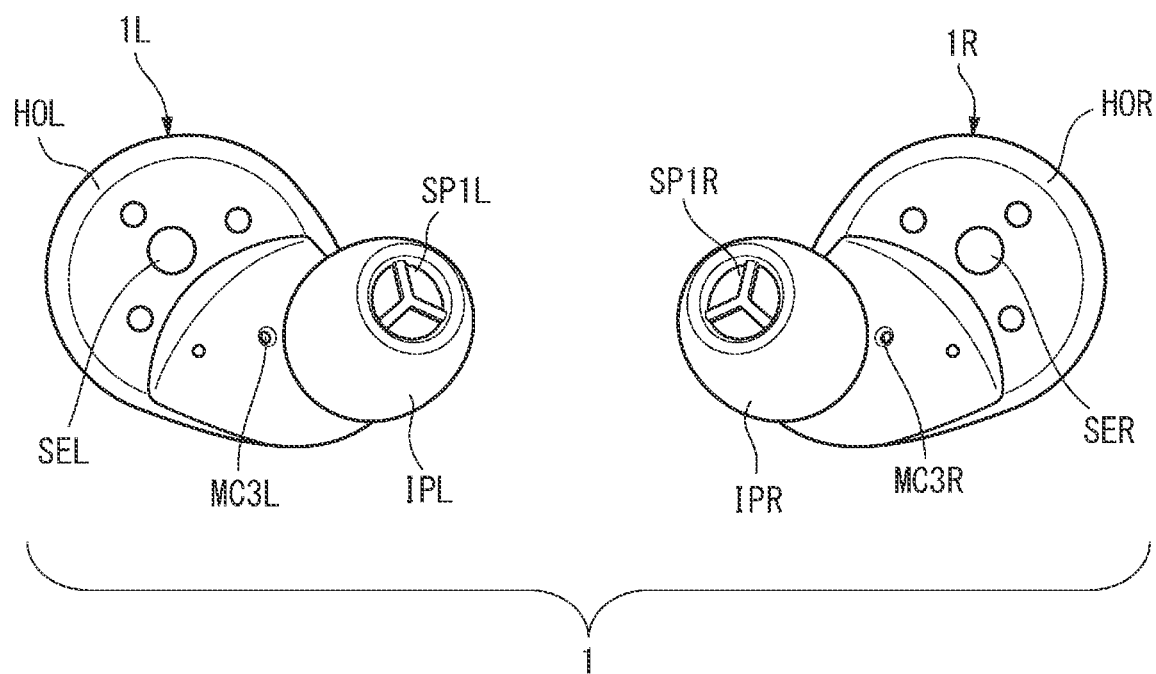
FIG. 2 is a rear view of the earphones according to the present embodiment.

First, hardware configurations of earphones will be described with reference to FIGS. 1 and 2. FIG. 1 shows a front view of the earphones. FIG. 2 shows a rear view of the earphones.

For convenience of explanation, as shown in FIG. 1, an axis orthogonal to a surface of a touch sensor TCL of an earphone 1L is taken as a Z axis. An axis perpendicular to the Z axis (that is, parallel to the touch sensor TCL of the earphone 1L) and extending from the earphone 1L to an earphone 1R is taken as a Y axis. An axis perpendicular to the Y axis and the Z axis is taken as an X axis. In the present embodiment, an orientation of the earphone 1L according to FIG. 1 is defined as the front view. Expressions related to these directions are used for convenience of description, and are not intended to limit a posture of a structure in actual use. The same applies to other drawings.

In the present embodiment, in a pair of left and right earphones 1L and 1R, a left ear earphone 1L and a right ear earphone 1R have the same configuration. Reference numerals in the drawings of the same components are expressed by adding "L" to an end of the reference numeral "1" in a case of the left ear earphone 1L and adding "R" to an end of the reference numeral "1" in a case of the right ear earphone 1R. In the following description, only the earphone 1L on the left side will be described, and the explanation of the earphone 1R on the right side will be omitted.

The earphones 1 are two earphones 1L and 1R that are respectively worn on a left ear and a right ear of a user, and a plurality of earpieces having different sizes are replaceably attached to one end portion of each of the earphones 1L and 1R.

As shown in FIG. 1, the earphone 1L is an inner acoustic device used by being worn on the ear of the user, and receives sound data (for example, music data) transmitted wirelessly (for example, short-range wireless communication such as Bluetooth (registered trademark)) from an external device such as a smartphone or a portable music player carried by the user. The earphone 1L acoustically outputs a sound signal based on the received sound data. The earphone 1L is placed on a cradle (not shown), which is a charging case, when not in use. In a case where a battery B1L (FIG. 3) built in the earphone 1L is not fully charged, when the earphone 1L is placed on a predetermined placement of the cradle, the battery B1L built in the earphone 1L is charged based on electric power transmitted from the cradle.

A housing HOL is provided as a structural member of the earphone 1L. The housing HOL is constituted by a composite of materials such as synthetic resin, metal, and ceramic, and a storage space is formed inside the housing HOL. The housing HOL has a cylindrical portion (not shown) whose inner space communicating with the storage space.

The earphone 1L includes an earpiece IPL attached to a main body of the earphone 1L. For example, the earphone 1L is held in the ear of the user by the earpiece IPL while being inserted inside an ear canal of the ear, and the held state is a use state of the earphone 1L.

The earpiece IPL is made of a flexible material such as silicon, and is formed by injection-molding with an inner cylinder (not shown) and an outer cylinder (not shown). The earpiece IPL is fixed by being inserted into the cylindrical portion of the housing HOL at the inner cylinder thereof, and is provided so as to be replaceable (detachable) with respect to the cylindrical portion of the housing HOL. The earpiece IPL is fitted in the ear canal of the user at the outer cylinder thereof, and is elastically deformed according to a shape of the ear canal to be fitted. By the elastic deformation of the earpiece IPL, the earpiece IPL is held in the ear canal of the user. The earpiece IPL has a plurality of different sizes. In the earpiece IPL, an earpiece of any size among a plurality of earpieces of different sizes is attached to the earphone 1L and worn on the left ear of the user (hereinafter, earpiece worn on an ear of the user is referred to as a "worn earpiece").

As an example of an operation input unit, a touch sensor TCL is provided on the other end portion opposite to the one end portion to which the earpiece IPL of the housing HOL is attached as shown in FIG. 1. The touch sensor TCL is a sensor element having a touch sensor function of detecting an input operation (for example, touch operation) of the user. The sensor element is, for example, an electrode of a capacitive touch sensor. The touch sensor TCL may be formed as, for example, a perfect circular surface, or may be formed as, for example, an elliptical surface. The touch sensor TCL may be formed as a rectangular surface.

Examples of the touch operation on the touch sensor TCL by a finger or the like of the user include the following operations. When the touch operation is performed for a short period of time, the earphone 1L may instruct the external device to perform any one of play, stop, fast forward, and rewind, and the like of music. When the touch operation is performed for a long time, the earphone 1L may perform a pairing operation or the like for performing wireless communication such as Bluetooth (registered trademark) with an external device such as a smartphone. When a surface of the touch sensor TCL is traced with a finger (swipe operation), the earphone 1L may perform volume adjustment or the like of the playing music.

A light 10L (example of a light emitting element) is disposed at a position on one end side of a housing of the earphone 1L corresponding to an end portion (for example, end portion on an operation surface along a+X direction) on an operation surface of the touch sensor TCL provided so as to be exposed to the housing HOL. As an example of the light 10L, a light emission diode (LED) may be used. The light 10L is used, for example, when the external device and the earphone 1L are associated with each other on a one-to-one basis (hereinafter, referred to as pairing) by wirelessly communicating with the external device carried by the user. The light 10L indicates operations such as lighting, blinking in a single color, and blinking in a different color when pairing is completed. The use and the operation method of the light 10L are examples and are not limited thereto.

The earphone 1L includes a plurality of microphones (microphone MC1L, microphone MC2L, and microphone MC3L) as electrical and electronic members. The plurality of microphones are stored in the storage space (not shown) of the housing HOL.

As shown in FIG. 1, the microphone MC1L is provided on the housing HOL, and is disposed so as to be able to collect an ambient sound and the like outside the earphone 1L. That is, the microphone MC1L can detect the ambient sound of the user in a state where the earphone 1L is worn on the ear of the user. The microphone MC1L converts an external ambient sound into an electrical signal (sound signal) and transmits the electrical signal to a sound signal input and output control unit S1L.

As shown in FIG. 1, the microphone MC2L is provided on the housing HOL, and is disposed to be able to collect an audio signal based on an utterance of a user wearing the earphone 1L. Therefore, the earphone 1L can realize a hands-free call in a state where the earphone 1L can communicate with a mobile phone device such as the smartphone F1 of the user. The microphone MC2L is configured by a microphone device capable of collecting (that is, detecting the audio signal) the sound generated based on the utterance of the user. The microphone MC2L collects the sound generated based on the utterance of the user, converts the sound into an electrical signal, and transmits the electrical signal to the sound signal input and output control unit S1L. The microphone MC2L is disposed such that an extending direction of the earphone 1L faces a mouth of the user when the earphone 1L is inserted into the left ear of the user (see FIG. 1), and is disposed at a position below the touch sensor TCL (that is, −X direction). A sound uttered by the user is collected by the microphone MC2L and converted into an electrical signal, and the microphone MC2L can detect whether the user has uttered based on an amplitude of the electrical signal.

As shown in FIG. 2, the microphone MC3L is disposed in a plane near the cylindrical portion of the housing HOL, and is disposed as close as possible to the ear canal of the left ear of the user. The microphone MC3L converts a sound leaking from a gap between the ear of the user and the earpiece IPL in a state where the earphone 1L is worn on the ear of the user into an electrical signal (sound signal) and transmits the electrical signal to the sound signal input and output control unit S1L.

As shown in FIG. 2, a speaker SP1L is disposed in the cylindrical portion of the housing HOL. The speaker SP1L is an electronic component and acoustically outputs sound data (for example, music data) wirelessly transmitted from the external device. In the housing HOL, a front surface of the speaker SP1L (in other words, sound emission surface of a sound acoustically output) is directed toward the cylindrical portion of the housing HOL covered with the earpiece IPL. Accordingly, the music data acoustically output from the speaker SP1L is further transmitted from an ear hole (for example, external ear portion) of the user to an internal ear and an eardrum, and the user can listen to the music data.

A wearing sensor SEL is configured by a device that detects whether the earphone 1L is worn on the left ear of the user, and is configured by using, for example, an infrared sensor or an electrostatic sensor. In a case of the infrared sensor, if the earphone 1L is worn on the left ear of the user, the wearing sensor SEL can detect that the earphone 1L is worn on the left ear of the user by receiving infrared rays reflected in the left ear by infrared rays emitted from the wearing sensor SEL. If the earphone 1L is not worn on the left ear of the user, the wearing sensor SEL can detect that the earphone 1L is not worn on the left ear of the user by not reflecting the infrared rays emitted from the wearing sensor SEL and not receiving the infrared rays. In a case of the electrostatic sensor, if the earphone 1L is worn on the left ear of the user, the wearing sensor SEL can detect that the earphone 1L is worn on the left ear of the user by determining that a change value of an electrostatic capacitance according to a distance to an inside of the left ear of the user is larger than a threshold held by the wearing sensor SEL. If the earphone 1L is not worn on the left ear of the user, the wearing sensor SEL can detect that the earphone 1L is not worn on the left ear of the user by determining that the change value of the electrostatic capacitance is smaller than the threshold held by the wearing sensor SEL. The wearing sensor SEL is provided at a position facing the ear canal when the earphone 1L is inserted into the left ear of the user and on a back side of the touch sensor TCL.

Thus, the earphone 1L includes the speaker SP1L and the microphone MC3L, and the worn earpiece, which is one of the plurality of earpieces, is worn on the left ear or the right ear of the user.

Figure 3:
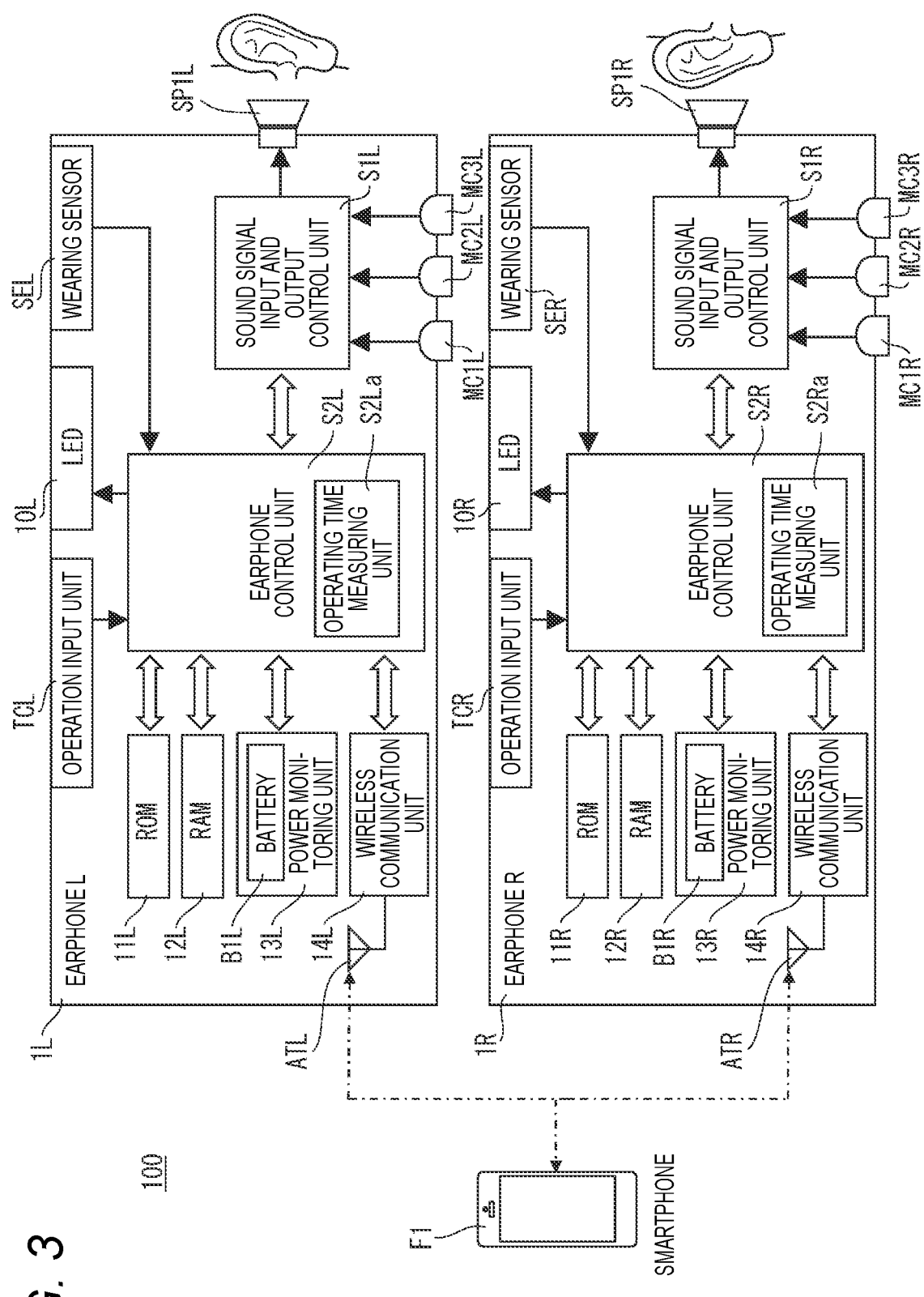
FIG. 3 is a block diagram of the earphones according to the present embodiment.

Next, a block diagram of the earphones will be described with reference to FIG. 3. FIG. 3 is a block diagram of the earphones according to the present embodiment. FIG. 3 is a block diagram of each of the pair of left and right earphones 1L and 1R shown in FIGS. 1 and 2. Although a configuration of the earphone 1L of the pair of left and right earphones 1L and 1R will be described below, a configuration of the earphone 1R is the same as the configuration of the earphone 1L. Therefore, the explanation of the earphone 1R is also omitted in FIG. 3.

A measurement system 100 includes the earphone 1L, the earphone 1R, and the smartphone F1.

The touch sensor TCL, which is an example of the operation input unit, is communicably connected to an earphone control unit S2L. The touch sensor TCL outputs a signal related to a touch operation performed by the user to the earphone control unit S2L.

The wearing sensor SEL is communicably connected to the earphone control unit S2L, and outputs a signal indicating whether the ear of the user and the earphone 1L are in contact with each other to the earphone control unit S2L.

A power monitoring unit 13L is configured using, for example, a semiconductor chip. The power monitoring unit 13L includes the battery B1L and measures a battery level of the battery B1L. The battery B1L is, for example, a lithium ion battery. The power monitoring unit 13L outputs information on the measured battery level of the battery B1L to the earphone control unit S2L.

The sound signal input and output control unit S1L is configured using, for example, a processor such as a central processing unit (CPU), a micro processing unit (MPU), or a digital signal processor (DSP). The sound signal input and output control unit S1L is communicably connected to the earphone control unit S2L, and exchanges a sound signal with a digital signal converted into a digital format by a pulse code modulation (PCM) method. The sound signal input and output control unit S1L adjusts a volume level of a digital signal related to a sound signal acquired from the smartphone F1 and outputs the digital signal to the speaker SP1L.

The sound signal input and output control unit S1L is connected to the microphone MC1L, the microphone MC2L, and the microphone MC3L, and a sound signal collected by each microphone is input from each microphone. The sound signal input and output control unit S1L can perform processing such as amplifying the sound signal input from each microphone, converting an analog signal into a digital signal, and the like. The sound signal input and output control unit transmits data of the sound signal input from each microphone to the earphone control unit S2L.

The earphone control unit S2L is configured using, for example, a processor such as a CPU, an MPU, or a DSP, is communicably connected to the sound signal input and output control unit S1L, a ROM 11L, a RAM 12L, the power monitoring unit 13L, and a wireless communication unit 14L, and exchanges the sound signal with the digital signal converted into a digital format by the PCM method. The earphone control unit S2L functions as a controller that controls an overall operation of the earphone 1L, and performs control processing for controlling the operation of each unit of the earphone 1L, data input and output processing between units of the earphone 1L, data calculation processing, and data storage processing with each unit of the earphone 1L.

When the earphone control unit S2L acquires a signal input from the touch sensor TCL, the earphone control unit S2L turns on or blinks the light 10L. For example, when the earphone 1L is paired with an external device by wireless communication such as Bluetooth (registered trademark), the light 10L alternately blinks in a single color or different colors. This is an example, and the operation of the light 10L is not limited thereto. The earphone control unit S2L may acquire information on the battery level of the battery B1L from the power monitoring unit 13L, and may turn on and blink the light 10L according to the battery level of the battery B1L.

The earphone control unit S2L receives a sound signal collected by the microphone MC3L from the sound signal input and output control unit S1L. The earphone control unit S2L performs processing such as amplifying the sound signal input from the sound signal input and output control unit S1L, and transmits the sound signal to the wireless communication unit 14L. The earphone control unit S2L may measure whether the ear of the user is sealed by the worn earpiece based on the sound signal collected by the microphone MC3L.

The sound signal input and output control unit S1L and the earphone control unit S2L implement respective functions by using programs and data stored in a read only memory (ROM) 11L. The sound signal input and output control unit S1L and the earphone control unit S2L may temporarily store generated or acquired data or information in a RAM (Random Access Memory) 12L by using the RAM 12L during operation.

The wireless communication unit 14L wirelessly connects the earphone 1L and the smartphone F1 so as to be able to transmit and receive the sound signal, and transmits a sound signal processed by the sound signal input and output control unit S1L or the earphone control unit S2L to the smartphone F1. The wireless communication unit 14L includes an antenna ATL, and performs short-range wireless communication in accordance with a communication standard of, for example, Bluetooth (registered trademark). The wireless communication unit 14L may be provided so as to be connectable to a communication line such as Wi-Fi (registered trademark), a mobile communication line, or the like. Each of the earphones 1L and 1R can individually perform wireless communication with the smartphone F1 using the wireless communication unit 14L and a wireless communication unit 14R. Therefore, each of the earphones 1L and 1R can receive data, a sound signal, or information transmitted from the smartphone F1.

The smartphone F1 is a wireless terminal carried by the user.

Figure 4:
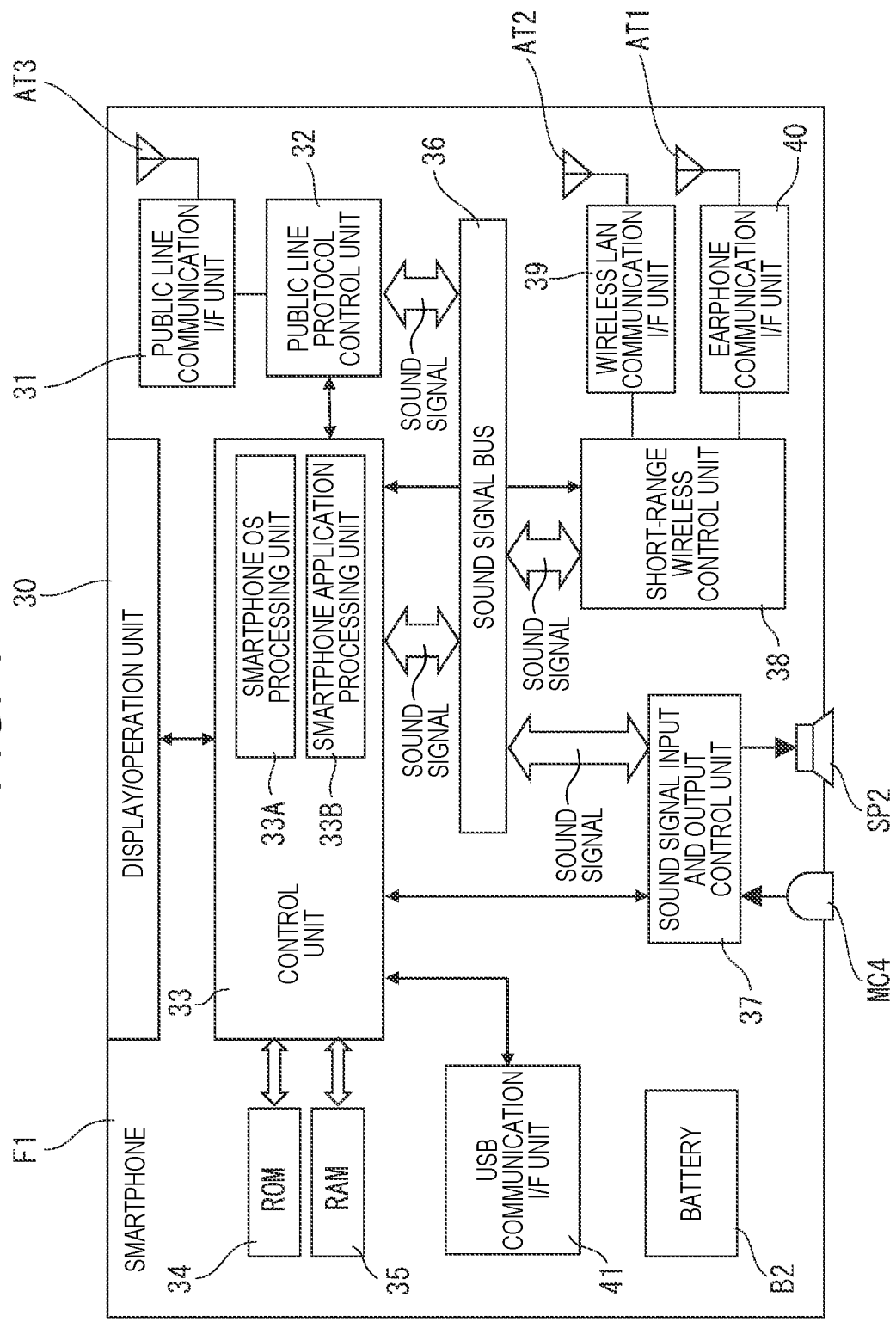
FIG. 4 is a block diagram of a smartphone according to the present embodiment.

Next, with reference to FIG. 4, a hardware configuration example of the smartphone will be described using a block diagram of the smartphone. FIG. 4 is a block diagram of the smartphone according to the present embodiment. The smartphone F1 includes a display and operation unit (display/operation unit) 30, a mobile line communication I/F unit 31, a mobile line protocol control unit 32, a control unit 33, a ROM 34, a RAM 35, a sound signal bus 36, a sound signal input and output control unit 37, a short-range wireless control unit 38, a wireless LAN communication I/F unit 39, an earphone communication I/F unit 40, a USB communication I/F unit 41, and a battery B2. In FIG. 4, the interface is abbreviated as "IF".

The display/operation unit 30 as an example of a display unit or an operation unit is configured using a touch panel that receives an operation of the user and displays data generated by the control unit 33, and forms a user interface. The display/operation unit 30 may display various screens generated by the control unit 33. The display/operation unit 30 receives operations of the user on the displayed various screens, generates an input signal, and transmits the input signal to the control unit 33.

The mobile line communication I/F unit 31 is connected to an antenna AT3 included in the smartphone F1, and performs wireless communication (for example, wireless communication conforming to a 4th generation mobile communication system (4G) such as a long term evolution (LTE) or a 5th generation mobile communication system (5G)) using a mobile line with a public base station (not shown). The mobile line communication I/F unit may be omitted from the configuration of the smartphone F1.

The mobile line protocol control unit 32 executes control related to input and output of data between the sound signal bus 36 and the mobile line communication I/F unit 31. The mobile line protocol control unit 32 may be omitted from the configuration of the smartphone F1.

The control unit 33 is configured using, for example, a processor such as a CPU, an MPU, or a DSP. The control unit 33 functionally includes a smartphone OS processing unit 33A and a smartphone application processing unit 33B, and performs various processing and controls by cooperation of the smartphone OS processing unit 33A and the smartphone application processing unit 33B with the ROM 34. The control unit 33 may measure whether the ear of the user is sealed by the worn earpiece based on the sound signal collected by the earphone 1 and transmitted from the earphone 1 to the smartphone F1.

A program that defines an operation of the control unit 33 and data used when the program is executed are written in the ROM 34. The ROM 34 stores identification information of the smartphone F1 and identification information of the earphones 1 registered (paired) in advance as a destination to which the sound signal is transmitted.

The RAM 35 is a RAM as a work memory used when each processing of the control unit 33 is executed, and temporarily stores data or information generated or acquired by the control unit 33.

The sound signal bus 36 inputs and outputs sound signal data to and from the control unit 33, sound signal data to and from the mobile line protocol control unit 32, sound signal data to and from the sound signal input and output control unit 37, and sound signal data to and from the short-range wireless control unit 38.

The sound signal input and output control unit 37 transmits sound signal data collected by a microphone MC4 to the control unit 33 via the sound signal bus 36, or outputs a sound signal input via the sound signal bus 36 from a speaker SP2, based on a command output from the control unit 33.

The microphone MC4 collects a sound based on an utterance of the user using the smartphone F1, converts the sound into a sound signal, and transmits the converted sound signal to the sound signal input and output control unit 37. The sound signal collected by the microphone MC4 is input to the control unit 33 via the sound signal input and output control unit 37 and the sound signal bus 36.

The speaker SP2 acoustically outputs sound signal data from the sound signal input and output control unit 37.

The short-range wireless control unit 38 executes control related to input and output of data between the sound signal bus 36 and the wireless LAN communication I/F unit 39 and between the sound signal bus 36 and the earphone communication I/F unit 40. The short-range wireless control unit 38 transmits the command output from the control unit 33 and data of the sound signal input via the sound signal bus 36 to the wireless LAN communication I/F unit 39 or the earphone communication I/F unit 40. The short-range wireless control unit 38 may transmit data of a sound signal input from the wireless LAN communication I/F unit 39 or the earphone communication I/F unit 40 to the control unit 33.

The wireless LAN communication I/F unit 39 is connected to an antenna AT2 included in the smartphone F1, and performs wireless communication (for example, data transmission from the short-range wireless control unit 38) with the earphones 1 through a wireless LAN. The wireless LAN communication I/F unit 39 is configured using a communication circuit connectable to the Internet via a wireless LAN router (not shown). The wireless LAN communication I/F unit 39 may perform wireless communication (for example, wireless LAN such as Wi-Fi (registered trademark)) with each of the earphones 1L and 1R via the wireless LAN router (not shown).

The earphone communication I/F unit 40 is connected to an antenna AT1 included in the smartphone F1, and performs short-range wireless communication (for example, data transmission from the short-range wireless control unit 38) with the earphone 1 by the Bluetooth.

The USB communication I/F unit 41 is an interface for communicating the smartphone F1 with an external device (for example, personal computer (PC)) by wire such as a cable. The USB communication I/F unit 41 is connected to the control unit 33 so that data communication is possible, and can transmit data from the external device to the control unit 33. Electric charge may be supplied from an external power source to the battery B2 via the USB communication OF unit 41.

The battery B2 supplies power to the smartphone F1, which is a battery capable of storing the electric charge supplied from the external power source. The battery B2 may be configured to be detachable. The battery B2 may directly receive the supply of power from the external power source, or can supply power to the smartphone F1 in a state where the battery B2 is disconnected from the external power source.

Figure 5:
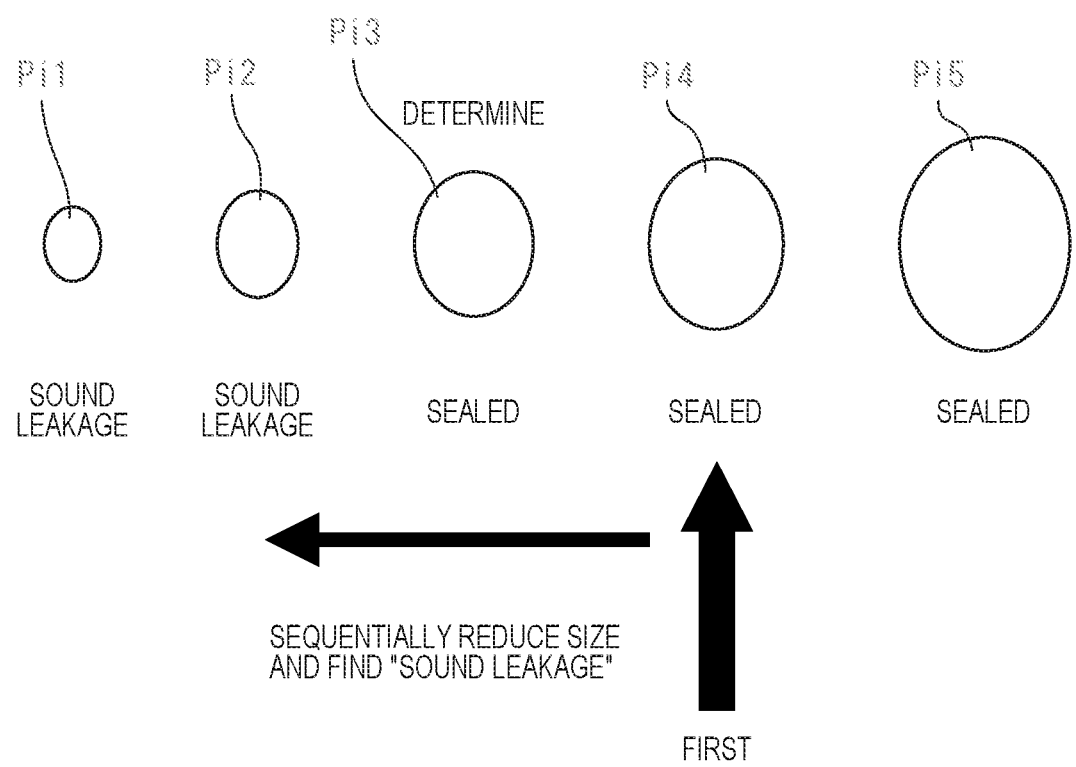
FIG. 5 is a diagram showing a first order of replacing the earpieces.
Figure 6:
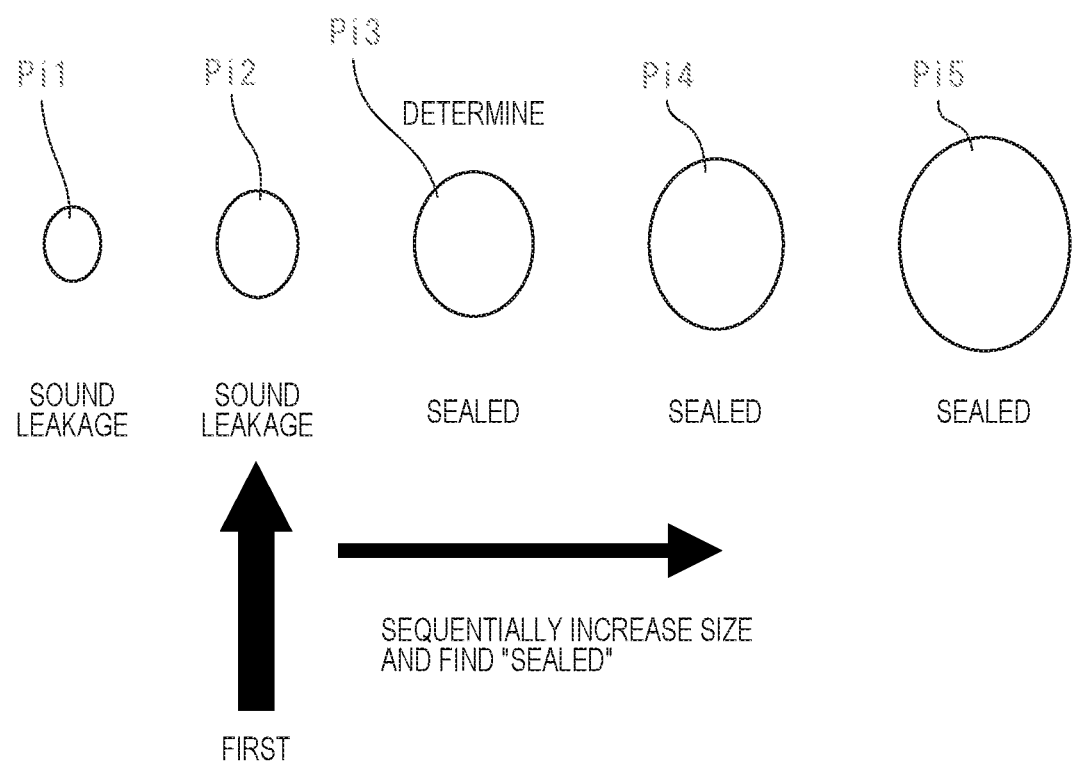
FIG. 6 is a diagram showing a second order of replacing the earpieces.

Next, orders of replacing the earpieces will be described with reference to FIGS. 5 and 6. FIG. 5 is a diagram showing a first order of replacing the earpieces. FIG. 6 is a diagram showing a second order of replacing the earpieces.

Each of parts Pi1, Pi2, Pi3, Pi4, and Pi5 shown in FIGS. 5 and 6 is an earpiece, and the earpieces are schematically shown to explain a difference in size between the earpieces. A part Pi1 is an earpiece having the smallest size among the parts Pi1, Pi2, Pi3, Pi4, and Pi5. A part Pi2 is an earpiece having a size larger than that of the part Pi1 and smaller than that of a part Pi3. The part Pi3 is an earpiece having a size larger than that of the part Pi2 and smaller than that of a part Pi4. The part Pi4 is an earpiece having a size larger than that of the part Pi3 and smaller than that of a part Pi5. The part Pi5 is an earpiece having the largest size among the parts Pi1, Pi2, Pi3, Pi4, and Pi5.

In FIGS. 5 and 6, when either the smartphone F1 or the earphone 1 of the measurement system 100 determines that the ear of the user is sealed by the worn earpiece, the state is recorded as "sealed". In FIGS. 5 and 6, when either the smartphone F1 or the earphone 1 of the measurement system 100 determines that the ear of the user is not sealed by the worn earpiece, the state is recorded as "sound leakage".

First, as shown in FIG. 5, a procedure for replacing an earpiece in a case that the earpiece worn by the user at the time of an initial measurement is determined as "sealed" will be described. In a case that the earpiece worn by the user at the time of the initial measurement is determined as "sealed", the user wears an earpiece having a smaller size next to the earpiece currently worn. The user sequentially reduces the sizes of the earpieces while repeating replacement of the earpieces until a worn earpiece is determined as "sound leakage". In a case that the worn earpiece is determined as "sound leakage", an earpiece having a size larger by one than that of the earpiece that is determined as "sound leakage" first is determined to be an earpiece having a size estimated to be optimal for the ear of the user.

For example, in a case that the user first wears the earpiece of the part Pi4 and the earpiece of the part Pi4 is determined as "sealed", the user next wears the earpiece of the part Pi3. In a case that the earpiece of the part Pi3 is determined as "sealed", the user next wears the earpiece of the part Pi2. In a case that the earpiece of the part Pi2 is determined as "sound leakage", it is determined that the earpiece of the part Pi3 is an earpiece having a size estimated to be optimal for the ear of the user.

In this way, in a case that a measurement result obtained by either the smartphone F1 or the earphone 1 of the measurement system 100 is that the left ear or the right ear of the user is sealed by the earpiece worn by the user at the time of the initial measurement, the smartphone F1 displays, on the display/operation unit 30, a notification urging the user to replace the worn earpiece with an earpiece having a smaller size next to the worn earpiece. Thereafter, in a case that a measurement result is first that the left ear or the right ear of the user is not sealed by the worn earpiece among the measurement results obtained by the measurement processing repeatedly executed by either the smartphone F1 or the earphone 1 of the measurement system 100, the smartphone F1 displays, on the display/operation unit 30, a notification indicating that a larger size next to the size of the worn earpiece is estimated to be optimal for the left ear or the right ear of the user, corresponding to the measurement result.

Next, as shown in FIG. 6, the procedure for replacing the earpiece in a case that the earpiece worn by the user at the time of the initial measurement is determined as "sound leakage" will be described. In a case that the earpiece worn by the user at the time of the initial measurement is determined as "sound leakage", the user replace the earpiece currently worn with an earpiece having a larger size next to the earpiece currently worn. The user sequentially increases the sizes of the earpieces while repeating replacement of the earpieces until a worn earpiece is determined as "sealed". In a case that the worn earpiece is determined as "sealed", an earpiece that is first determined as "sealed" is determined to be an earpiece having a size estimated to be optimal for the ear of the user.

For example, in a case that the user first wears the earpiece of the part Pi2 and the earpiece of the part Pi2 is determined as "sound leakage", the user next wears the earpiece of the part Pi3. In a case that the part Pi3 is determined as "sealed", it is determined that the earpiece of the part Pi3 is an earpiece having a size estimated to be optimal for the ear of the user.

In this way, in a case that a measurement result obtained by either the smartphone F1 or the earphone 1 of the measurement system 100 is that the left ear or the right ear of the user is not sealed by the earpiece worn by the user at the time of the initial measurement, the smartphone F1 displays, on the display/operation unit 30, a notification urging the user to replace the worn earpiece with a larger earpiece next to the worn earpiece. Thereafter, in a case that a measurement result is first that the left ear or the right ear of the user is sealed by the worn earpiece among the measurement results obtained by the measurement processing repeatedly executed by either the smartphone F1 or the earphone 1 of the measurement system 100, the smartphone F1 displays, on the display/operation unit 30, a notification indicating that the size of the worn earpiece is estimated to be optimal for the left ear or the right ear of the user, corresponding to the measurement result.

Figure 7:
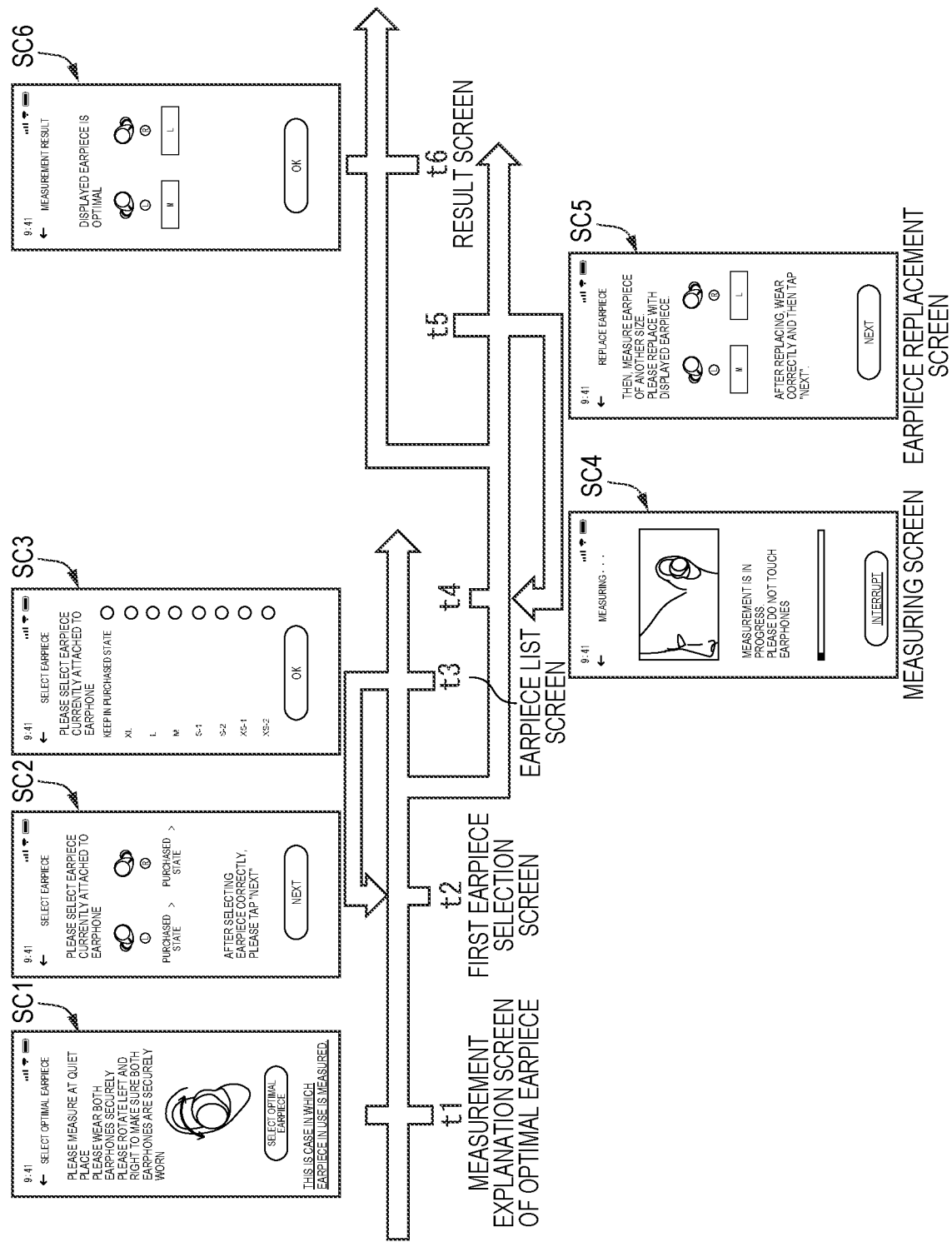
FIG. 7 is a diagram showing a transition example of a screen of the smartphone.

Next, a transition example of a screen of the smartphone will be described with reference to FIG. 7. FIG. 7 is a diagram showing a transition example of a screen of the smartphone. FIG. 7 illustrates a transition example of a screen generated by an application used to measure an earpiece assumed to have an optimal size for the ear of the user. The application is executed by the smartphone application processing unit 33B of the smartphone F1.

Screen examples SC1, SC2, SC3, SC4, SC5, and SC6 shown in FIG. 7 are examples of screens generated by the control unit 33 (for example, smartphone application processing unit 33B) and displayed on the display/operation unit 30. In a case that the user performs an input on a screen displayed on the display/operation unit 30, the screen transitions under the control of the smartphone application processing unit 33B.

A screen example SC1 is displayed at time t1, and is an explanation screen of measurement of an earpiece estimated to have an optimal size for the ear of the user. The screen example SC1 includes, for example, a message such as an instruction requested to the user to correctly perform measurement. For example, the message is "please measure at a quiet place", "please wear both earphones securely", and "please rotate earphones left and right to make sure both earphones are securely worn". The message is not limited thereto. In a case that the user presses a button of "select an optimal earpiece" in the screen example SC1, the screen example SC1 transitions to a screen example SC2 under the control of the smartphone application processing unit 33B.

The screen example SC2 is a screen displayed at time t2 and requesting the user to input a size of an earpiece currently attached to the earphone 1. In a case that the size of the earpiece is input, the screen transitions to a screen example SC3 under the control of the smartphone application processing unit 33B.

The screen example SC3 is displayed at time t3, and when an instruction for urging the user to input a size of an earpiece attached to the earphone 1L or 1R before first measurement processing by the control unit 33 is output, the screen example SC3 includes, as an option of the input, "the earpieces are kept in the purchased state" indicating a size of an earpiece IPL or IPR attached to the earphone 1L or 1R in advance when the user purchases the earpieces. In a case that the user inputs the size of the earpiece and then presses an "OK" button, the screen example SC3 returns to the screen example SC2 under the control of the smartphone application processing unit 33B. In a case that the user completes the input of the sizes of the earpieces of the right ear and left ear earphones and then presses a "next" button, the screen example SC2 transitions to a screen example SC4 under the control of the smartphone application processing unit 33B.

The screen example SC4 is a screen displayed at time t4 and indicating that the measurement is in progress. The screen example SC4 is a screen indicating that the measurement is currently in progress during the measurement processing is performed by the control unit 33. The screen example SC4 includes, for example, a message "Measurement is in progress. Please do not touch the earphones." For example, a gauge indicating the progress of the measurement is included. The progress may be illustrated by a percentage or a pie chart. In a case that the measurement ends, the screen example SC4 transitions to a screen example SC5 under the control of the smartphone application processing unit 33B.

The screen example SC5 is a screen displayed at time t5 and urging the user to replace the earpiece. The screen example SC5 is a screen including at least an image or a schematic diagram of each of the earphones 1L and 1R of the left ear and the right ear, a size of each earpiece to be measured next to the earpiece worn on each of the left ear and the right ear, and a text urging replacement with an earpiece having a size to be measured next. In a case that the user presses the "next" button, the screen example SC5 returns to the screen example SC4 under the control of the smartphone application processing unit 33B.

A screen example SC6 is a screen displayed at time t6 and indicating that the measurement is completed. The screen example SC6 is a screen displayed when the control unit 33 performs the measurement processing and a size of an earpiece estimated to be optimal for the ear of the user is determined. The screen example SC6 is a screen including at least an image or a schematic diagram of each of the earphones 1L and 1R of the left ear and the right ear, and a size of an earpiece estimated to be optimal for the ear of the user based on a result of the measurement processing.

Figure 8:
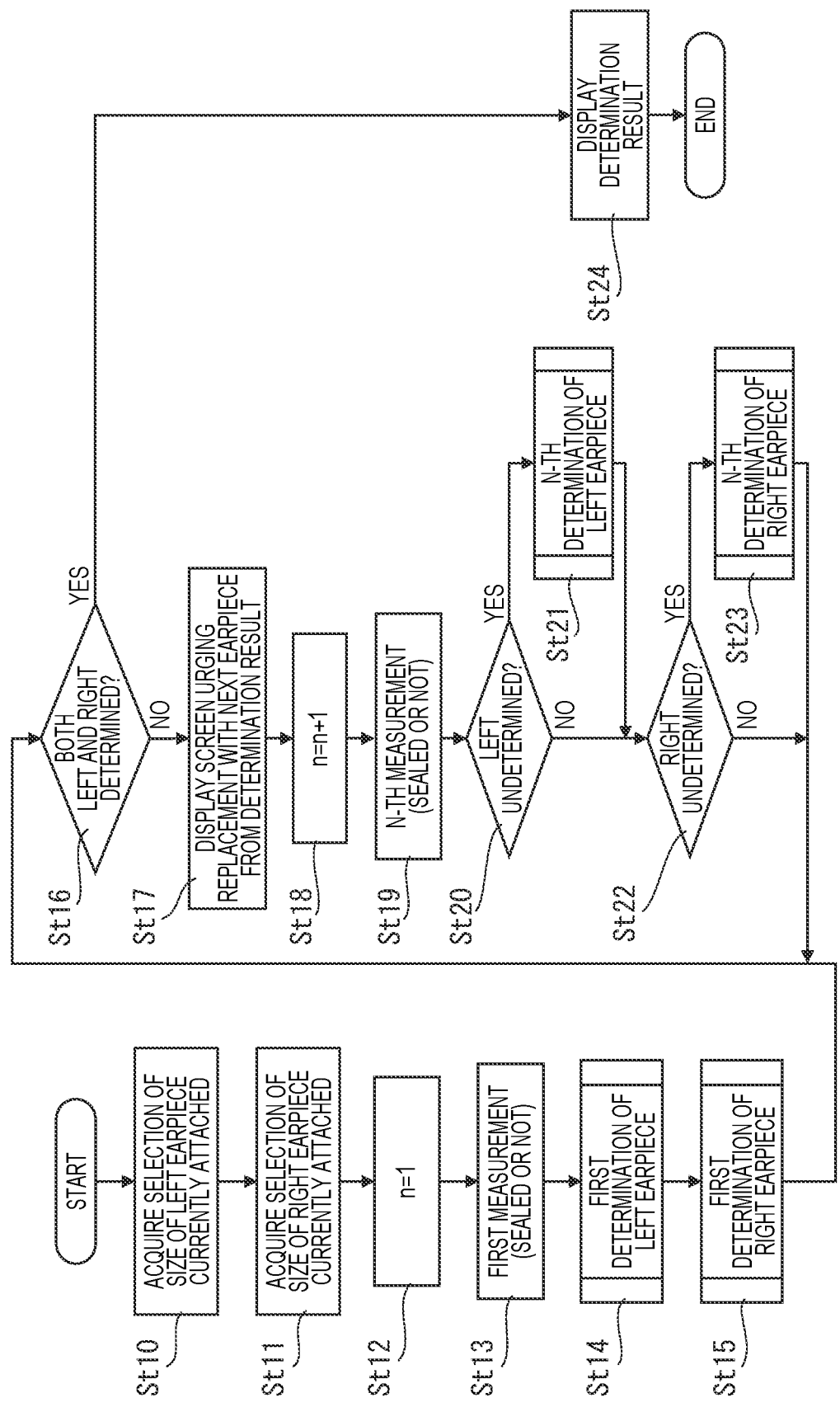
FIG. 8 is a flowchart for determining earpieces having appropriate sizes.

Next, a flowchart for determining earpieces having appropriate sizes will be described with reference to FIG. 8. FIG. 8 is a flowchart for determining earpieces having appropriate sizes. The flowchart of FIG. 8 is processing performed by the control unit 33.

The display/operation unit 30 outputs a screen including a description of measurement of an earpiece estimated to have an optimal size for the ear of the user before the first measurement processing (see screen example SC1 in FIG. 7). After the screen including the description of the measurement of the earpiece is outputted, the display/operation unit 30 outputs an instruction for urging the user to input the size of the earpiece attached to the earphone 1L before the first measurement processing (see screen example SC2 and screen example SC3 in FIG. 7). In a case that the display/operation unit 30 receives an input for selecting the size of the earpiece IPL currently attached to the earphone 1L from the user, the display/operation unit 30 transmits a signal corresponding to a content of the input to the control unit 33. The control unit 33 acquires a signal corresponding to information on the size of the earpiece IPL from the display/operation unit 30 (St10).

The display/operation unit 30 outputs an instruction for urging the user to input the size of the earpiece attached to the earphone 1R before the first measurement processing (see screen example SC2 and screen example SC3 in FIG. 7). In a case that the display/operation unit 30 receives an input for selecting the size of the earpiece IPR currently attached to the earphone 1R from the user, the display/operation unit 30 transmits a signal corresponding to a content of the input to the control unit 33. The control unit 33 acquires a signal corresponding to information on the size of the earpiece IPR from the display/operation unit 30 (St11).

The control unit 33 sets a parameter (n) indicating the number of times of measurement to 1 (St12).

The control unit 33 instructs the earphone 1 to execute the first measurement processing relating to whether the left ear or the right ear of the user is sealed by the worn earpiece (St13).

The control unit 33 performs first determination of the earpiece IPL of the left ear based on a result of the measurement processing measured in the processing of step St13 (St14). Processing of step St14 will be described with reference to FIG. 9. During the control unit 33 performs the processing of step St13, the display/operation unit 30 outputs a screen indicating that the measurement is currently in progress (see screen example SC4 in FIG. 7).

The control unit 33 performs first determination of the earpiece IPR of the right ear based on the result of the measurement processing measured in the processing of step St13 (St15). Processing of step St15 will be described with reference to FIG. 9. During the control unit 33 performs the processing of step St13, the display/operation unit 30 outputs the screen indicating that the measurement is currently in progress (see screen example SC4 in FIG. 7).

The control unit 33 checks whether sizes of the earpieces IPL and IPR of the left ear and the right ear are both determined (St16). In a case that the sizes of the earpieces IPL and IPR of the left ear and the right ear are both determined in the processing of step St16 (St16, YES), a determined result is displayed on the display/operation unit 30 (St24) (see screen example SC6 in FIG. 7).

In the processing of step St16, in a case that the sizes of the earpieces IPL and IPR of the left ear and the right ear are both not determined, or in a case that a size of one of the earpieces is not determined (NO in St16), the control unit 33 generates a screen urging the replacement with a next earpiece having a different size from a determination result, and transmits the screen to the display/operation unit 30. The display/operation unit 30 displays the screen acquired from the control unit 33 (St17) (see screen example SC5 in FIG. 7).

The control unit 33 adds 1 to the parameter (n) indicating the number of times of measurement (in other words, increments n) (St18).

The control unit 33 instructs the earphone 1 to execute n-th measurement processing relating to whether the left ear or the right ear of the user is sealed by the worn earpiece (St19).

The control unit 33 checks whether the size of the earpiece IPL of the left ear is determined based on a result of the n-th measurement processing measured in the processing of step St14 or St21 (St20). In a case that the size of the earpiece IPL of the left ear is not determined in the processing of step St20 (St20, YES), the control unit 33 performs n-th determination of the earpiece IPL of the left ear (St21). Processing of step St21 will be described with reference to FIG. 10. After the processing of step St21, the processing of the control unit 33 proceeds to processing of step St22.

In a case that the size of the earpiece IPL of the left ear is determined in the processing of step St20 (St20, NO), or after the processing of step St21, the control unit 33 checks whether the size of the earpiece IPR of the right ear is determined based on the result of the n-th measurement processing measured in the processing of step St15 or St23 (St22). In a case that the size of the earpiece of the right ear is not determined in the processing of step St22 (St22, YES), the control unit 33 performs n-th determination of the earpiece IPR of the right ear (St23). Processing of step St23 will be described with reference to FIG. 10.

In a case that the size of the earpiece IPR of the right ear is determined in the processing of step St22 (NO in St22), or after the processing of step St23, the processing of the control unit 33 returns to the processing of step St16.

Figure 9:
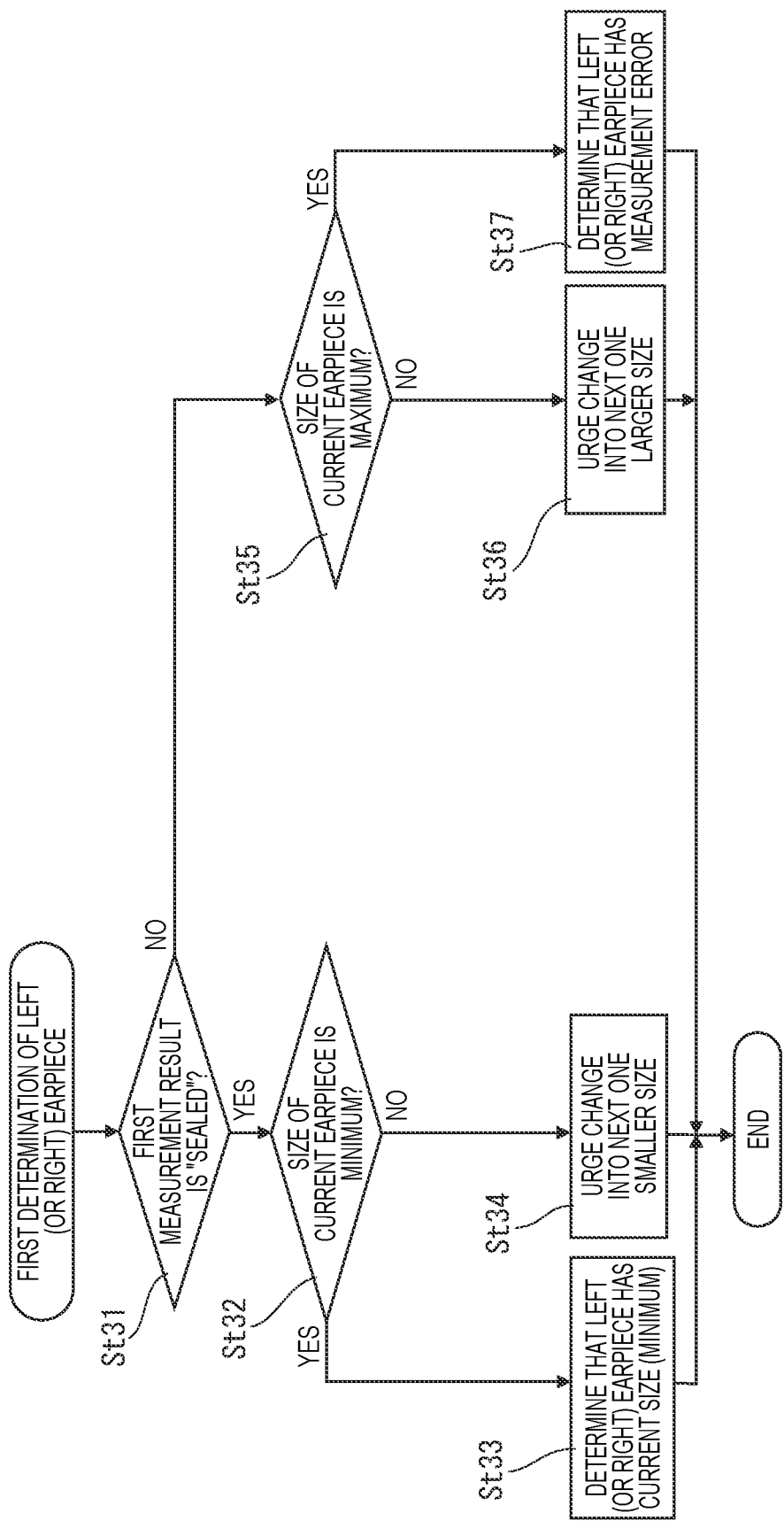
FIG. 9 is a flowchart of first determination of sizes of the earpieces.

Next, a flowchart of the first determination of the sizes of the earpieces will be described with reference to FIG. 9. FIG. 9 is a flowchart of the first determination of the sizes of the earpieces. The flowchart of FIG. 9 is processing performed by the control unit 33. The flowchart of FIG. 9 is a flowchart of determination of the earpiece IPL of the left ear or the earpiece IPR of the right ear. Hereinafter, only a case of the earpiece IPL of the left ear will be described, and a case of the earpiece IPR of the right ear will be omitted, but the same can be applied by replacing the left ear with the right ear and the earpiece IPL with the earpiece IPR.

The control unit 33 checks whether the result of the first measurement processing indicates that the ear of the user is sealed by the earpiece IPL of the left ear (St31). In a case that the result of the measurement processing indicates that the ear of the user is sealed (St31, YES) in the processing of step St31, the control unit 33 determines whether the size of the worn earpiece is minimum (St32).

In a case that it is determined in the processing of step St32 that the size of the worn earpiece is minimum (St32, YES), the control unit 33 determines that the size of the worn earpiece is estimated to be optimal for the ear of the user (St33). A screen for urging a change in the size of the earpiece determined in step St33 is displayed in the processing of step St24 in FIG. 8.

In a case that it is determined in the processing of step St32 that the size of the worn earpiece is not minimum (St32, NO), the control unit 33 determines an earpiece having a size smaller by one than the size of the worn earpiece as an earpiece having a size into which the user is urged to change next (St34). A screen for urging a change in the size of the earpiece determined in step St34 is displayed in the processing of step St17 in FIG. 8.

In a case that the measurement result indicates that the ear of the user is not sealed (St31, NO) in the processing of step St31, the control unit 33 determines whether the size of the worn earpiece is maximum (St35).

In a case that it is determined in the processing of step St35 that the size of the worn earpiece is not maximum (St35, NO), the control unit 33 determines an earpiece having a size larger by one than the size of the worn earpiece as an earpiece having a size into which the user is urged to change next (St36). A screen for urging a change in the size of the earpiece determined in step St36 is displayed in the processing of step St17 in FIG. 8.

In a case that it is determined in the processing of step St35 that the size of the worn earpiece is maximum (St35, YES), the control unit 33 determines that the earpiece estimated to be optimal for the left ear cannot be measured (St37). A screen indicating that the earpiece estimated to be optimal for the left ear cannot be measured in step St37 is displayed in the processing of step St24 in FIG. 8.

Figure 10:
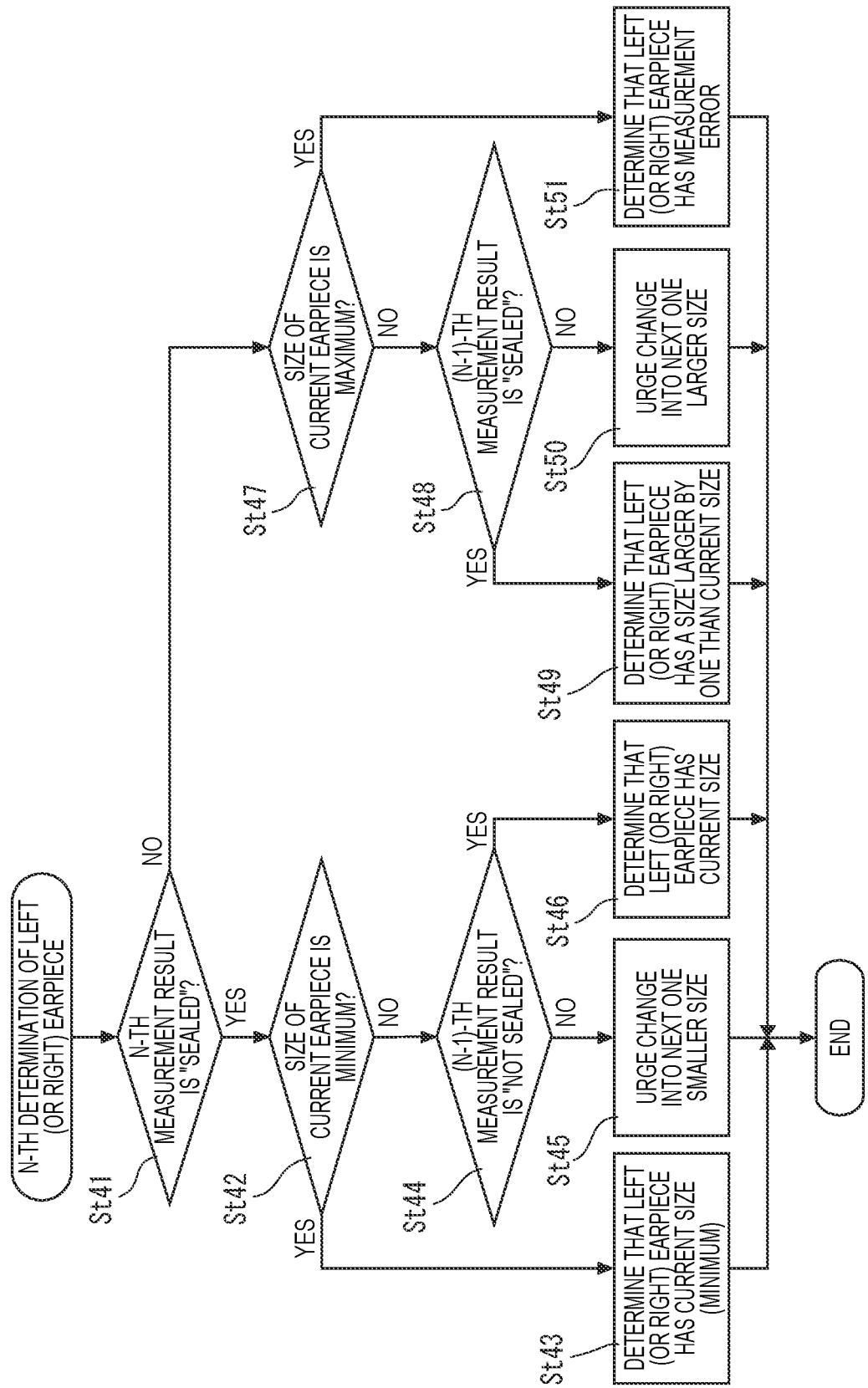
FIG. 10 is a flowchart of n-th determination of the sizes of the earpieces.

Next, a flowchart of n-th determination of the sizes of the earpieces will be described with reference to FIG. 10. FIG. 10 is a flowchart of n-th determination of the sizes of the earpieces. The flowchart of FIG. 10 is processing performed by the control unit 33. The flowchart of FIG. 10 is a flowchart of determination of the earpiece IPL of the left ear or the earpiece IPR of the right ear. Hereinafter, only a case of the earpiece IPL of the left ear will be described, and a case of the earpiece IPR of the right ear will be omitted, but the same can be applied by replacing the left ear with the right ear and the earpiece IPL with the earpiece IPR.

The control unit 33 checks whether the result of the n-th measurement processing indicates that the ear of the user is sealed by the earpiece IPL of the left (St41). In a case that the result of the measurement processing indicates that the ear of the user is sealed (St41, YES) in the processing of step St41, the control unit 33 determines whether the size of the worn earpiece is minimum (St42).

In a case that it is determined in the processing of step St42 that the size of the worn earpiece is minimum (St42, YES), the control unit 33 determines that the size of the worn earpiece is estimated to be optimal for the ear of the user (St43). A screen for urging a change in the size of the earpiece determined in step St43 is displayed in the processing of step St24 in FIG. 8.

In a case that it is determined in the processing of step St42 that the size of the worn earpiece is not minimum (St42, NO), the control unit 33 determines whether a previous measurement result, that is, an (n−1)-th measurement result indicates that the ear of the user is sealed by the earpiece IPL of the left ear (St44).

In a case that the measurement result indicates that the ear of the user is sealed in the processing of step St44 (St44, NO), the control unit 33 determines an earpiece having a size smaller by one than the size of the worn earpiece as an earpiece having a size into which the user is urged to change next (St45). A screen for urging a change in the size of the earpiece determined in step St45 is displayed in the processing of step St17 in FIG. 8.

In a case that the measurement result indicates that the ear of the user is not sealed in the processing of step St44 (St44, YES), the control unit 33 determines that the size of the worn earpiece is estimated to be optimal for the ear of the user (St46). A screen for urging a change in the size of the earpiece determined in step St46 is displayed in the processing of step St24 in FIG. 8.

In a case that the measurement result indicates that the ear of the user is not sealed (St41, NO) in the processing of step St41, the control unit 33 determines whether the size of the worn earpiece is maximum (St47).

In a case that it is determined in the processing of step St47 that the size of the worn earpiece is not maximum (St47, NO), the control unit 33 determines whether a previous measurement result, that is, an (n−1)-th measurement result indicates that the ear of the user is sealed by the earpiece of the left ear (St48).

In a case that the measurement result indicates that the ear of the user is sealed in the processing of step St48 (St48, YES), the control unit 33 determines that an earpiece having a larger size next to the size of the earpiece worn by the user is an earpiece estimated to be optimal for the ear of the user (St49). A screen for urging a change in the size of the earpiece determined in step St49 is displayed in the processing of step St24 in FIG. 8.

In a case that the measurement result indicates that the ear of the user is not sealed in the processing of step St48 (St48, NO), the control unit 33 determines an earpiece having a size larger by one than the size of the worn earpiece as an earpiece having a size into which the user is urged to change next (St50). A screen for urging a change in the size of the earpiece determined in step St50 is displayed in the processing of step St17 in FIG. 8.

In a case that it is determined in the processing of step St47 that the size of the worn earpiece is maximum (St47, YES), the control unit 33 determines that the earpiece estimated to be optimal for the left ear cannot be measured (St51). A screen indicating that the earpiece estimated to be optimal for the left ear cannot be measured in step St51 is displayed in the processing of step St24 in FIG. 8.

In this way, in a case that the sound signal transmitted from the smartphone F1 or the sound signal output from the earphone 1 is output from the speakers SP1L and SP1R, the earphone 1 collects the sound by the microphones MC3L and MC3R. The measurement system 100 performs the measurement processing at least once to determine whether the left ear or the right ear of the user is sealed by the worn earpiece based on the collected sound signal. The smartphone F1 includes the display/operation unit 30, and displays, on the display/operation unit 30, a notification indicating that the size of the worn earpiece worn by the user is the most suitable size among sizes of a plurality of earpieces, or a notification urging replacement with another earpiece having a size larger or smaller than the size of the worn earpiece, based on a result of the measurement processing.

In this way, the measurement system 100 includes two earphones 1L and 1R that are respectively worn on the left ear and the right ear of the user and are interchangeably attached with the plurality of earpieces having different sizes on one end portion of each of the earphones 1L and 1R, and the smartphone F1 carried by the user. The earphones 1L and 1R include speakers SP1L and SP1R and microphones MC3L and MC3R, and in a situation that a worn earpiece, which is one of the plurality of earpieces, is worn on the left ear or the right ear of the user and the sound signal transmitted from the smartphone F1 or the sound signal output from the earphone 1 is output from the speaker, the sound is collected by the microphones MC3L and MC3R. The measurement system 100 performs the measurement processing at least once to determine whether the left ear or the right ear of the user is sealed by the worn earpiece based on the collected sound signal. The smartphone F1 includes the display/operation unit 30, and displays, on the display/operation unit 30, the notification indicating that the size of the worn earpiece worn by the user is the most suitable size among sizes of the plurality of earpieces, or the notification urging replacement with another earpiece having a size larger or smaller than the size of the worn earpiece, based on the result of the measurement processing.

Accordingly, the measurement system 100 can efficiently specify earpieces having sizes estimated to be optimal for ears of the user and improve convenience when the user selects earpieces.

Based on a measurement result indicating that the left ear or the right ear of the user is not sealed by the worn earpiece among measurement results obtained by the measurement processing repeatedly executed by the measurement system 100, the smartphone F1 displays, on the display/operation unit 30, a notification urging replacement with another earpiece having a larger size next to a size of the worn earpiece, corresponding to the measurement result. Accordingly, the user can minimize the replacement of the earpiece until the user finds an earpiece estimated to be optimal for the ear of the user from the worn earpiece at the start of determination.

Based on a measurement result indicating that the left ear or the right ear of the user is sealed by the worn earpiece among the measurement results obtained by the measurement processing repeatedly executed by the measurement system 100, the smartphone F1 displays, on the display/operation unit 30, a notification urging replacement with another earpiece having a smaller size next to a size of the worn earpiece, corresponding to the measurement result. Accordingly, the user can minimize the replacement of the earpiece until the user finds an earpiece estimated to be optimal for the ear of the user from the worn earpiece at the start of determination.

The smartphone F1 displays a screen indicating that measurement is currently in progress on the display/operation unit 30. Accordingly, the user can visually confirm that the measurement processing is currently in progress.

In a case that the earphones 1L and 1R perform the measurement processing and the worn earpieces are not the most suitable sizes among the sizes of the plurality of earpieces, the smartphone F1 displays, on the display/operation unit 30, a screen including at least an image or a schematic diagram of each of the earphones 1L and 1R of the left ear and the right ear, a size of each earpiece to be measured next to an earpiece worn on each of the left ear and the right ear, and a text urging replacement with an earpiece having the size. Accordingly, the smartphone F1 can support the user's operation of replacing the earpieces by displaying an easy-to-understand screen on the display/operation unit 30 in a case that the user replaces the earpieces.

In a case that the earphones 1L and 1R perform the measurement processing and the worn earpieces are the most suitable sizes among the sizes of the plurality of earpieces, the smartphone F1 displays, on the display/operation unit 30, a screen including at least an image or a schematic diagram of an earphone of each of the left ear and the right ear, and a size of an earpiece estimated to be optimal for the ear of the user based on a result of the measurement processing. Accordingly, the user can visually confirm an earpiece having a size most suitable for the user.

The smartphone F1 outputs an instruction for urging the user to input the sizes of the earpieces attached to the earphones 1L and 1R before the first measurement processing. Accordingly, since the user can start measurement of the worn earpiece, the user can efficiently specify the earpieces having the sizes estimated to be optimal for the ears of the user and improve convenience when the user selects earpieces.

In a case that the smartphone F1 outputs the instruction for urging the user to input the sizes of the earpieces attached to the earphones 1L and 1R before the first measurement processing, the instruction includes, as one of input options, an option indicating a state in which earpieces attached to the earphones 1L and 1R in advance are not replaced at the time of purchase of a product. Accordingly, even if the user does not know the sizes of the earpieces attached to the earphones 1L and 1R in advance, the user can input the sizes of the worn earpieces before the first measurement processing. Accordingly, the measurement system 100 can support the user to easily start the measurement processing.

Although the embodiments have been described with reference to the accompanying drawings, the present disclosure is not limited to such examples. It will be apparent to those skilled in the art that various changes, modifications, substitutions, additions, deletions, and equivalents can be conceived within the scope of the claims, and it should be understood that such changes and the like also belong to the technical scope of the present disclosure. Components in the above embodiment may be optionally combined within a range not departing from the spirit of the invention.

The technique of the present disclosure is useful as providing a measurement system and a measurement method that efficiently specify the earpieces having the sizes estimated to be optimal for the ears of the user and improve convenience when the user selects earpieces.

What is claimed is:

1. A measurement system comprising:
   earphones configured to be respectively worn on a left ear and a right ear of a user and configured to be interchangeably attached with a plurality of earpieces having different sizes on one end portion of each of the earphones; and
   a wireless terminal configured to communicate with the earphones, wherein each of the earphones includes a speaker and a microphone,
   in a case that a sound signal transmitted from the wireless terminal or a sound signal output from the earphone is emitted from the speaker in a state that a worn earpiece, which is one of the plurality of earpieces, is worn on the left ear or the right ear of the user, the sound signal emitted from the speaker is collected by the microphone,
   the measurement system performs measurement processing at least once to determine whether or not the left ear or the right ear of the user is sealed by the worn earpiece based on the collected sound signal,
   the wireless terminal includes a display unit, and displays, on the display unit and each time the measurement processing is performed, a notification screen based on a result of the measurement processing,
   the display unit is configured to display a first notification screen indicating that a size of the worn earpiece worn by the user is a most suitable size among sizes of the plurality of earpieces, based on the result of the measurement processing, and
   the display unit is configured to display a second notification screen urging replacement with another earpiece having a size larger than or smaller than the size of the worn earpiece, based on the result of the measurement processing.

2. The measurement system according to claim 1, wherein based on a measurement result indicating that the left ear or the right ear of the user is not sealed by the worn earpiece among measurement results obtained by the measurement processing repeatedly executed by the measurement system, the wireless terminal displays, on the display unit, a notification urging replacement with another earpiece having a larger size next to a size of the worn earpiece which is worn by the user while the measurement result is obtained.

3. The measurement system according to claim 1, wherein based on a measurement result indicating that the left ear or the right ear of the user is sealed by the worn earpiece among the measurement results obtained by the measurement processing repeatedly executed by the measurement system, the wireless terminal displays, on the display unit, a notification urging replacement with another earpiece having a smaller size next to the size of the worn earpiece which is worn by the user while the measurement result is obtained.

4. The measurement system according to claim 1, wherein the wireless terminal displays a screen indicating that measurement is currently in progress on the display unit.

5. The measurement system according to claim 1, wherein the wireless terminal displays, on the display unit, a screen including an image or a schematic diagram of an earphone of each of the left ear and the right ear, a size of each of earpieces to be measured next to an earpiece worn on each of the left ear and the right ear, and a text urging replacement with an earpiece having the size to be measured.

6. The measurement system according to claim 1, wherein the wireless terminal displays, on the display unit, a screen including an image or a schematic diagram of an earphone of each of the left ear and the right ear and a size of an earpiece estimated to be optimal for an ear of the user based on a result of the measurement processing.

7. The measurement system according to claim 1, wherein the wireless terminal outputs an instruction for urging the user to input sizes of earpieces attached to the earphones before first measurement processing is executed.

8. The measurement system according to claim 7, wherein in a case that the wireless terminal outputs the instruction for urging the user to input the sizes of the earpieces attached to the earphones before the first measurement processing is executed, the instruction includes, as one of input options, an option indicating a state that earpieces attached to the earphones in advance at a time of purchase of the earphones are not replaced.

9. The measurement system according to claim 1, wherein in a case that a measurement result of the measurement processing indicates that the left ear or the right ear of the user is sealed by the worn earpiece, the wireless terminal displays, on the display unit, a notification urging replacement with an earpiece having a size smaller than the size of the worn earpiece worn by the user, in a case that a measurement result of the measurement processing indicates that the left ear or the right ear of the user is not sealed by the worn earpiece, the wireless terminal displays, on the display unit, a notification urging replacement with an earpiece having a size larger than the size of the worn earpiece worn by the user.

10. The measurement system according to claim 1, wherein, in a case that a measurement result of the measurement processing indicates that the left ear or the right ear of the user is sealed by the worn earpiece,
the wireless terminal displays, on the display unit, a notification urging replacement with an earpiece having a size smaller than the size of the worn earpiece worn by the user,
the measurement processing is repeated until a measurement result of the measurement processing indicates that the left ear or the right ear of the user is not sealed by a currently worn earpiece, and
the wireless terminal displays, on the display unit, a notification indicating that a larger size next to the size of the currently worn earpiece is estimated to be optimal for the left ear or the right ear of the user.

11. A measurement method for controlling earphones configured to be respectively worn on a left ear and a right ear of a user and configured to be interchangeably attached with a plurality of earpieces having different sizes on one end portion of each of the earphones, and a wireless terminal configured to communicate with the earphones, the method comprising:
in each of the earphones, collecting a sound signal by a microphone of the earphone in a case that the sound signal transmitted from the wireless terminal or a sound signal output from the earphone is emitted from a speaker of the earphone in a state that a worn earpiece, which is one of the plurality of earpieces, is worn on the left ear or the right ear of the user;
performing measurement processing at least once to determine whether or not the left ear or the right ear of the user is sealed by the worn earpiece based on the collected sound signal; and
displaying, on a display unit of the wireless terminal and each time the measurement processing is performed, a notification screen based on a result of the measurement processing, wherein
the display unit is configured to display a first notification screen indicating that a size of the worn earpiece worn by the user is a most suitable size among sizes of the plurality of earpieces, based on the result of the measurement processing, and
the display unit is configured to display a second notification screen urging replacement with another earpiece having a size larger than or smaller than the size of the worn earpiece, based on the result of the measurement processing.

* * * * *